United States Patent
Kuchenski et al.

(10) Patent No.: US 12,493,878 B2
(45) Date of Patent: Dec. 9, 2025

(54) SYSTEM FOR INPUTTING A PIN BLOCK TO A NETWORK

(71) Applicant: Diebold Nixdorf, Incorporated, North Canton, OH (US)

(72) Inventors: David William Kuchenski, Tallmadge, OH (US); Richard Harris, Southampton (GB); Anne Konecny, Uniontown, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 1138 days.

(21) Appl. No.: 17/256,366

(22) PCT Filed: May 20, 2019

(86) PCT No.: PCT/US2019/033073
§ 371 (c)(1),
(2) Date: Dec. 28, 2020

(87) PCT Pub. No.: WO2020/005409
PCT Pub. Date: Jan. 2, 2020

(65) Prior Publication Data
US 2021/0182856 A1   Jun. 17, 2021

Related U.S. Application Data

(60) Provisional application No. 62/691,782, filed on Jun. 29, 2018.

(51) Int. Cl.
*G06Q 20/18* (2012.01)
*G06Q 20/40* (2012.01)
(Continued)

(52) U.S. Cl.
CPC ......... *G06Q 20/4012* (2013.01); *G06Q 20/18* (2013.01); *G07F 19/211* (2013.01); *H04L 9/3263* (2013.01); *H04L 2209/56* (2013.01)

(58) Field of Classification Search
CPC .............. G06Q 20/4012; G06Q 20/20; H04L 2209/56; H04L 9/0825; G06F 21/31
See application file for complete search history.

(56) References Cited

U.S. PATENT DOCUMENTS

| 9,033,221 B1 * | 5/2015 | Ramachandran .. G06Q 20/3274 235/375 |
| 2008/0189214 A1 * | 8/2008 | Mueller ................. G06Q 20/20 705/72 |

(Continued)

FOREIGN PATENT DOCUMENTS

| CN | 101546407 A | * | 9/2009 |
| WO | 20160014784 A1 | | 1/2016 |

OTHER PUBLICATIONS

International Preliminary Report on Patentability and Written Opinion filed in the corresponding PCT Application dated Dec. 29, 2020; 8 pages.

(Continued)

*Primary Examiner* — Patrick McAtee
*Assistant Examiner* — Sima Asgari
(74) *Attorney, Agent, or Firm* — Black McCuskey

(57) ABSTRACT

A method for inputting pin blocks to a network can include receiving a first pin from a key pad with an encryption module, which is then encrypted to a first pin block with a network encryption key and transmitted to a first computing device that inputs the first pin block to a secure network. The encryption module can also receive a second pin block from a second computing device that is physically separate from the key pad. Prior to receiving the second pin block, the encryption module can transmit a certificate and a second certificate to the second computing device. The encryption module can decrypt the second pin block to a second pin and encrypt the second pin to a third pin block with the network encryption key, for inputting the third pin block to the secure network.

14 Claims, 7 Drawing Sheets

(51) Int. Cl.
*G07F 19/00* (2006.01)
*H04L 9/32* (2006.01)

(56) References Cited

U.S. PATENT DOCUMENTS

| | | | | |
|---|---|---|---|---|
| 2012/0239572 A1* | 9/2012 | Wolfs | ............... | G06Q 20/385 705/44 |
| 2014/0040147 A1* | 2/2014 | Varadarajan | ....... | G06Q 20/4016 713/168 |
| 2017/0091736 A1 | 3/2017 | Sleeman | | |

OTHER PUBLICATIONS

Alfred Jonathan Paul Scott Jca Menezes Katz Van Oorschot Vanstone, et al: "Handbook of Applied Cryptography", Oct. 16, 1996 (Oct. 16, 1996), XP055541793, Baton Rouge ISBN: 978-0-429-46633-5 Retried from the Internet: URL: http://cacr.uwaterloo.ca/hac/about/chap12.ps.

International Search Report filed in the corresponding PCT Application dated Aug. 27, 2019; 5 pages.

European Patent Office; Communication pursuant to Article 94(3) EPC for European Pat. App. 19 733 588.8, which claims priority to the same application as the present application; Aug. 16, 2023.

Author unknown; EMV FAQ; webpage; Jun. 13, 2018; http://web.archive.org/web/20180613094442/www.emv-connection.com/emv-faq/.

Author unknown; Public key certificate; webpage; Date Cannot Be Confirmed; https://en.wikipedia.org/w/index.php?title=Public_key_certificate&direction=prev&oldid=841451474.

Author unknown; Challenge-response authentication; webpage; Date Cannot Be Confirmed; https://en.wikipedia.org/w/index.php?title=Challenge%E2%80%93response_authentication&oldid=846633210.

\* cited by examiner

SYSTEM FOR INPUTTING A PIN BLOCK TO A NETWORK

CROSS-REFERENCE TO RELATED APPLICATIONS

This application is a National Phase application claiming priority to International Patent Application Serial No. PCT/US2019/033073 for a SYSTEM FOR INPUTTING A PIN BLOCK TO A NETWORK, filed on May 20, 2019, and also claims the benefit of U.S. Provisional Patent Application Ser. No. 62/691,782 for a SYSTEM FOR INPUTTING A PIN BLOCK TO A NETWORK, filed on Jun. 29, 2018, which is hereby incorporated by reference in its entirety.

BACKGROUND

This relates in general to methods and systems for receiving a personal identification number ("pin") from a user and inputting the pin in encrypted form (a "pin block") to a network.

U.S. Pub. No. 2017/0091736 discloses a SECURE DEVICE. One method embodiment includes decrypting first and second data received from first and second peripheral devices, respectively, of a Self-Service Terminal (SST) and verifying the first and second data properly originated from the first and second peripheral devices, respectively. This method may then decrypt third data received from a computer controlling operation of the SST and verifying the third data properly originated with the SST controlling computer. This method may then perform at least one remedial data processing activity when any one of the first, second, and third data are not verified as properly originated. Otherwise, when the first, second, and third data are verified as originating properly, the method includes transmitting the first, second, and third data to a transaction-processing host via a network.

International Publication No. WO 2016/014784 discloses an ENCRYPTING PIN RECEIVER. In an example embodiment, an encrypting personal identification number (PIN) receiver operable to receive a PIN from a source via a contactless interface. The PIN is decrypted with a key associated with the source, and subsequently encrypted with a key associated with a destination for the PIN. The PIN encrypted with the key associated with the destination is forwarded towards the destination via a second interface.

The Handbook of Applied Cryptography, by A. Menezes, P. van Oorschot, and S. Vanstone, CRC Press, 1996 discloses Key Establishment Protocols in chapter 12. This chapter considers key establishment protocols and related cryptographic techniques which provide shared secrets between two or more parties, typically for subsequent use as symmetric keys for a variety of cryptographic purposes including encryption, message authentication, and entity authentication. The main focus is two-party key establishment, with the aid of a trusted third party in some cases. While many concepts extend naturally to multi-party key establishment including conference keying protocols, such protocols rapidly become more complex, and are considered here only briefly, as is the related area of secret sharing. Broader aspects of key management, including distribution of public keys, certificates, and key life cycle issues, are deferred to Chapter 13.

U.S. Pat. No. 6,286,099 discloses a method for DETERMINING POINT OF INTERACTION DEVICE SECURITY PROPERTIES AND ENSURING SECURE TRANSACTIONS IN AN OPEN NETWORKING ENVIRONMENT. The method provides for determining point of interaction device security properties for secure transmission of a transaction between a plurality of electronic devices, such as point of interaction (POI) devices or computer systems (or both), over a public communication system, such as the Internet. In one embodiment, a communication is established between a first electronic device and a second electronic device using a public network. Digital certificates are then exchanged to validate the parties and to provide a secure channel for transmission of data. Device security properties of the first electronic device are determined based on information transmitted by the first electronic device to the second electronic device thereby allowing the second electronic device to accept or reject a transaction request from the first electronic device based (in part) on the device security properties of the first electronic device.

U.S. Pub. No. 2002/0036231 discloses a SELF-SERVICE TERMINAL. The self-service terminal has a port for transferring data. The terminal includes a program for informing a user about one or more electronic collectables that a user can request, and for transferring a requested electronic collectable to the user. The electronic collectables typically comprise an image, an associated description of the image, and file format information. A portable device for accessing such a terminal is also described. The device comprises a program for receiving a transferred electronic collectable and for presenting at least part of the transferred electronic collectable so that a user of the device can view an image and text portion of an electronic collectable downloaded from the terminal.

U.S. Pub. No. 2013/0212026 discloses systems and methods in which data associated with a transaction are protected with encryption. At an access device, a PIN associated with a payment account may be encrypted with a first key derived from an initial key of the access device and sensitive data associated with the payment account may be encrypted with a second key derived from the initial key. At a secure module associated with a host server encrypted sensitive data of an authorization request message may be decrypted. The secure module associated with the host server can re-encrypt the sensitive data using a zone encryption key associated with a payment processing network. A translated authorization request message including the re-encrypted sensitive data can be transmitted by the merchant server to the payment processing network.

SUMMARY

A method for inputting pin blocks to a network can include placing a key pad in communication with an encryption module having one or more processors. The method can also include receiving, at the encryption module, a first pin from the key pad. The method can also include encrypting, at the encryption module, the first pin to a first pin block with a network encryption key. The method can also include placing the encryption module in communication with a first computing device having one or more processors. The method can also include transmitting, with the encryption module, the first pin block to the first computing device. The method can also include inputting, with the first computing device, the first pin block to a secure network. The method can also include receiving, at the encryption module, over a wireless link, a second pin block from a second computing device physically separate from the key pad. The method can also include decrypting, with the encryption module, the second pin block to a second pin. The method can also include encrypting, with the encryption module, the second pin to a third pin block with the network encryption key. The method can also include inputting, with the first computing device, the third pin block to the secure network. The method can also include receiving, at the encryption module, from the second computing device, a request to transmit the second pin before the receiving the second pin block. The method can also include generating, at the encryption module, a first encryption key pair including a first public encryption key and a first private encryption key. The generating can be prior to the receiving of the second pin block from the second computing device. The generating can be further defined as generating, at the encryption module, the first encryption key pair in response to the receiving the request to transmit the second pin. The method can also include transmitting, with the encryption module, prior to the receiving the second pin block from the second computing device, a certificate to the second computing device. The certificate can include a first public encryption key different than the network encryption key. The transmitting the certificate can be further defined as transmitting the certificate to the second computing device in response to the receiving the request to transmit the second pin.

In other features, the method can also include transmitting, from the encryption module, the first public encryption key to the second computing device. The transmitting can be prior to the receiving of the second pin block from the second computing device. The first public encryption key is different than the network encryption key.

According to additional features, the decrypting can further comprise decrypting the second pin block to the second pin, at the encryption module after the receiving the second pin block, with the first private encryption key. The first private encryption key is different than the network encryption key. The decrypting can be prior to the encrypting the second pin with the network encryption key.

In other features, the method can also include utilizing, at the encryption module, the first private encryption key only once. The method can also include receiving, at the encryption module, from a third computing device physically separate from the key pad, a request to transmit a third pin. The third computing device is different from the second computing device and the third pin is different than the second pin. The method can also include generating, at the encryption module, a second encryption key pair including a second public encryption key and a second private encryption key. The second private encryption key is different than the first private encryption key and the second public encryption key is different than the first public encryption key. The method can also include transmitting, from the encryption module, the second public encryption key to the third computing device. The second public encryption key is different than the network encryption key. The method can also include receiving, at the encryption module, over the wireless link, a fourth pin block from the third computing device. The method can also include decrypting the fourth pin block to the third pin, at the encryption module, with the second private encryption key. The second private encryption key is different than the network encryption key. The method can also include encrypting, with the encryption module, the third pin to a fifth pin block with the network encryption key. The method can also include inputting, with the first computing device, the fifth pin block to the secure network.

According to other features, the method can also include receiving, at the encryption module, a random number from the second computing device. The receiving the random number can be prior to the receiving the second pin block from the second computing device and after the transmitting the certificate having the first public encryption key. The method can also include transmitting, with the encryption module, a message with the random number back to the second computing device. The method can also include signing the message, with the encryption module, with a first private encryption key different than the network encryption key. The method can also include verifying, with the second computing device, the signature of the message using the certificate. The method can also include encrypting, with the second computing device, the second pin with the first public encryption key associated with the certificate.

In other features, the method can also include receiving, at a third computing device having one or more processors, a first input defining a pre-staged transaction and including details of an exchange of at least one physical article at the first computing device and an account associated with a user. The third computing device can be remote from the first computing device, the encryption module, and the second computing device. The method can also include storing, with the third computing device, the first input in a database. The method can also include receiving, at the third computing device, a second input including the account associated with the user and indicative of the second computing device positioned proximate to the encryption module. The method can also include retrieving, with the third computing device, the first input from the database in response to the receiving the second input. The method can also include communicating, with the third computing device, at least part of the first input to the first computing device in response to the receiving the second input. The communicating can be prior to the receiving the second pin block from the second computing device. The receiving of the second input at the third computing device can be further defined as receiving the second input from the second computing device.

According to additional features, the method can also include generating, at the encryption module, an encryption key pair including a public encryption key and a private encryption key. Both of the public encryption key and the private encryption key can be distinct from the network encryption key. The generating can be prior to the receiving of the second pin block from the second computing device and in response to the communicating of at least part of the first input to the first computing device.

According to other features, the method can also include transmitting, with the encryption module, prior to the receiving the second pin block from the second computing device, a certificate to the second computing device. The certificate can include a first public encryption key. The first public encryption key can be different than the network encryption key.

DETAILED DESCRIPTION

Generally, the present disclosure is desirable to enhance a flow of user traffic at self-service terminals (SSTs) of any kind, including automated transaction machines (ATMs). SSTs can be utilized by a user to carry out a transaction. The transaction may involve the SST dispensing one or more articles to the user or may involve the user depositing one or more articles with the SST. ATMs are used by bank account holders to withdraw currency or bank notes, or to make deposits of such notes. Often, in order to initiate an exchange at the SST, the user must be authenticated. This process can include the user presenting a token in the form of a bank card and entering a pin.

Figure 1:
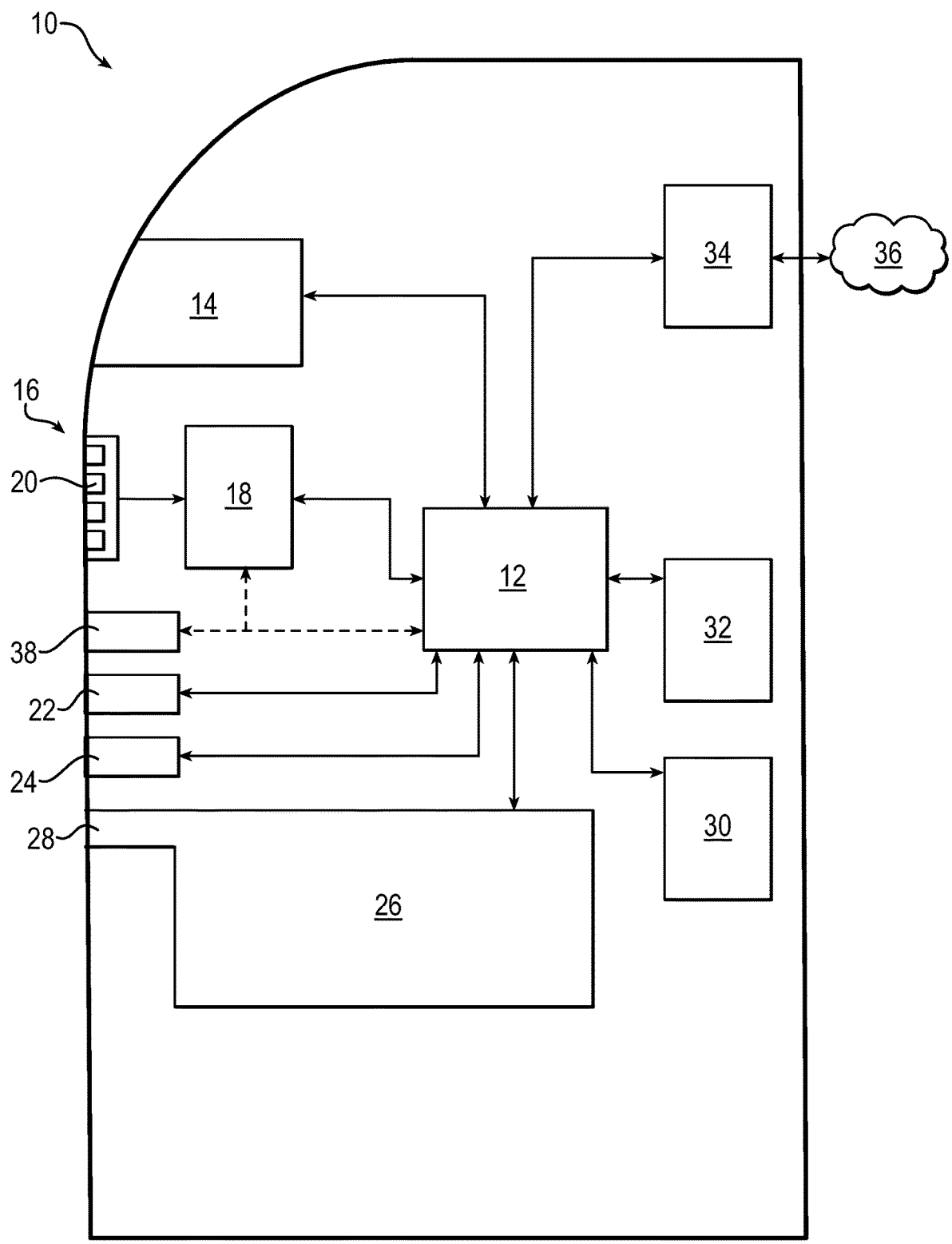
FIG. 1 is a functional block diagram of an exemplary automated transaction machine (ATM) according to one or more implementations of the present disclosure.

Referring now to the drawings, FIG. 1 discloses a functional block diagram of an exemplary ATM 10 according to one or more implementations of the present disclosure. It will be understood that embodiments of the present disclosure are applicable to other types of SSTs, such as vending machines and kiosks, by way of example and not limitation. The ATM 10 includes different structures and subsystems for executing and recording transactions. The ATM 10 includes a computing device 12. The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere in computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module is referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a pin. The key pad is placed in communication with the encryption module 18 and therefore the numbers of the pin are received by the encryption module 18. It is noted that the communication of the pin is direct and secure; the pin cannot be intercepted between the key pad 16 and the encryption module 18. The pin is then encrypted by the encryption module to define a pin block. The encryption module 18 includes a network encryption key and applies the network encryption key to encrypt the pin to a pin block. The exemplary encryption module 18 is configured to transmit the pin block to the computing device 12.

In a first exemplary operation, a first pin can be received from the key pad 16 at the encryption module 18. The user has typed the first pin using the key pad 16. The encryption module 18 can encrypt the first pin to a first pin block with a network encryption key. The encryption module 18 has been placed in communication with a first computing device 12 and can transmit the first pin block to the first computing device 12. The first computing device 12 can input the first pin block to a secure network for authorization of the transaction being requested by the user.

The exemplary ATM 10 also includes a card module 22. The card module 22 can receive a token from the user, such as a card. The card module 22 can be configured to execute read and write operations with respect to any storage medium fixed to the user's card. The exemplary card module 22 is configured to transmit any data read from the user's card to the computing device 12. The exemplary card module 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive and dispense items such as bank notes (cash) and checks. The exemplary article exchange unit 26 includes a slot 28 defined on an exterior of the ATM 10 for the passage of such items. In other embodiments of the present disclosure, an article exchange unit can be configured to facilitate the exchange of other items. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

As set forth above, the exemplary system 40 can interact with a computing device possessed by a user. A computing device possessed by a user can be a mobile computing device such as a smartphone, such as referenced at 44 in FIG. 2. The smartphone 44 can be operating at least partially under the control of the system 10. For example, the smartphone 44 can be operating a computer application (APP) at least partially controlled by the financial institution, such as a mobile banking APP. The APP, and thus the smartphone 44, can therefore be controlled in part by the computing device 42.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking server communicating with a plurality of ATMs. The exemplary transceiver 34 places the computing device 12 in communication with one or more networks, such as network 36. The network 36 can be a local area network (LAN), a wide area network (WAN) such as the Internet, or any combination thereof. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

Figure 2:
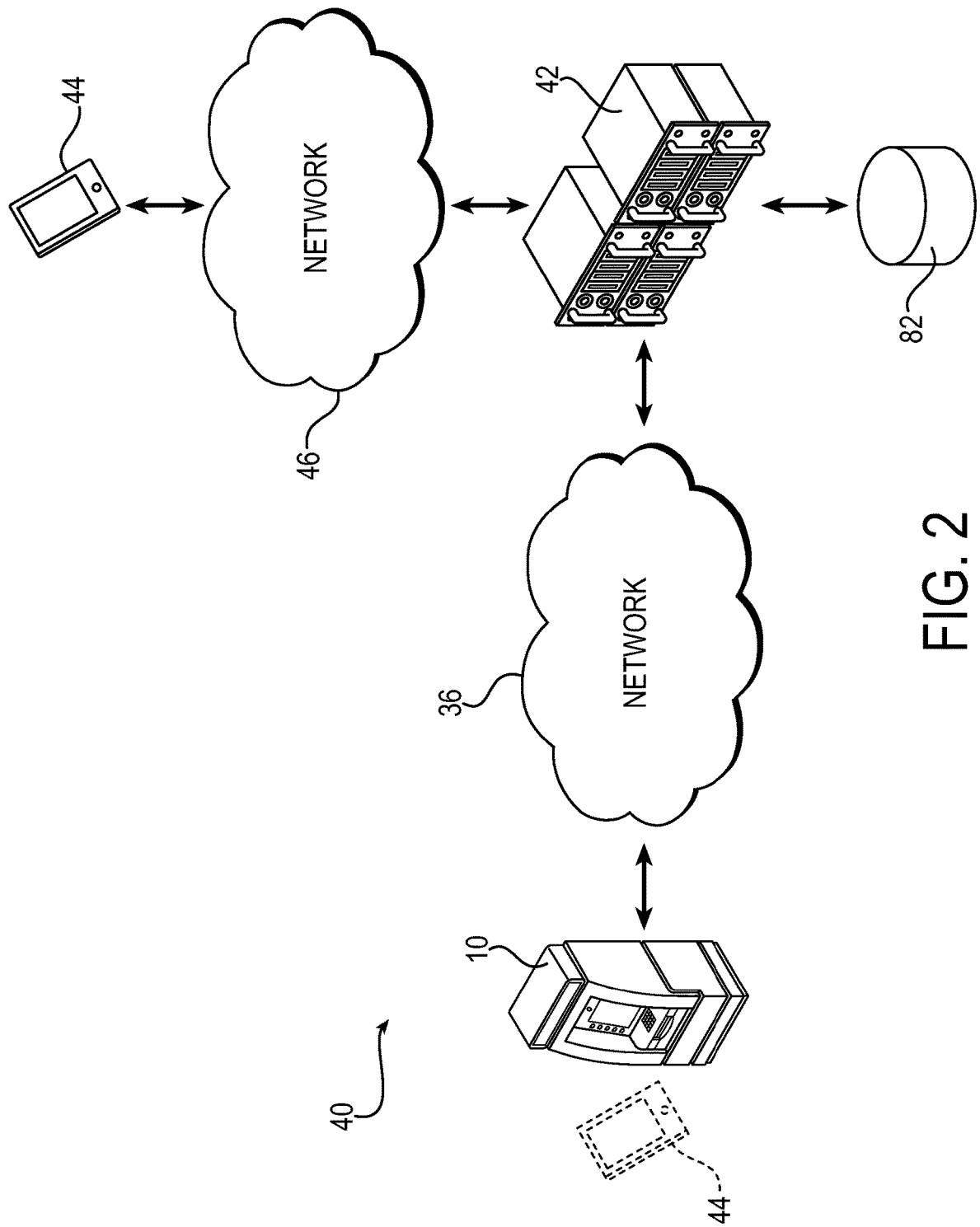
FIG. 2 is a functional block diagram of an exemplary system according to one or more implementations of the present disclosure.

The exemplary computing device 12 is thus configured to communicate with other computing devices. FIG. 2 is a functional block diagram of an exemplary system 40 according to one or more implementations of the present disclosure. The exemplary system 40 includes the ATM 10. The exemplary system 10 also includes a computing device 42, which is a server computing device in the exemplary embodiment of the present disclosure. The exemplary computing device 42 has one or more processors and a non-transitory, computer readable medium. The system 10 can be operated by a financial institution and the user can be an account holder of the financial institution. Other implementations of the present disclosure, by way of example and not limitation, can be a system can be operated by a merchant of consumer goods, a provider of healthcare-related products, or a delivery company.

The ATM 10 and the computing device 42 can communicate over the network 36. Transmissions over the network 36 may be encrypted and may include Message Authentication Codes (MACs) to enhance security. MACs are appended to messages sent from and received by a device such as the ATM 10. MACs verify that the messages sent and the messages received are identical and also confirm that messages originate from an approved source. The computing devices 12 and 42 can also apply Transport Layer Security (TLS) or Secure Sockets Layer (SSL) protocols and include respective firewalls to enhance security.

Figure 3:
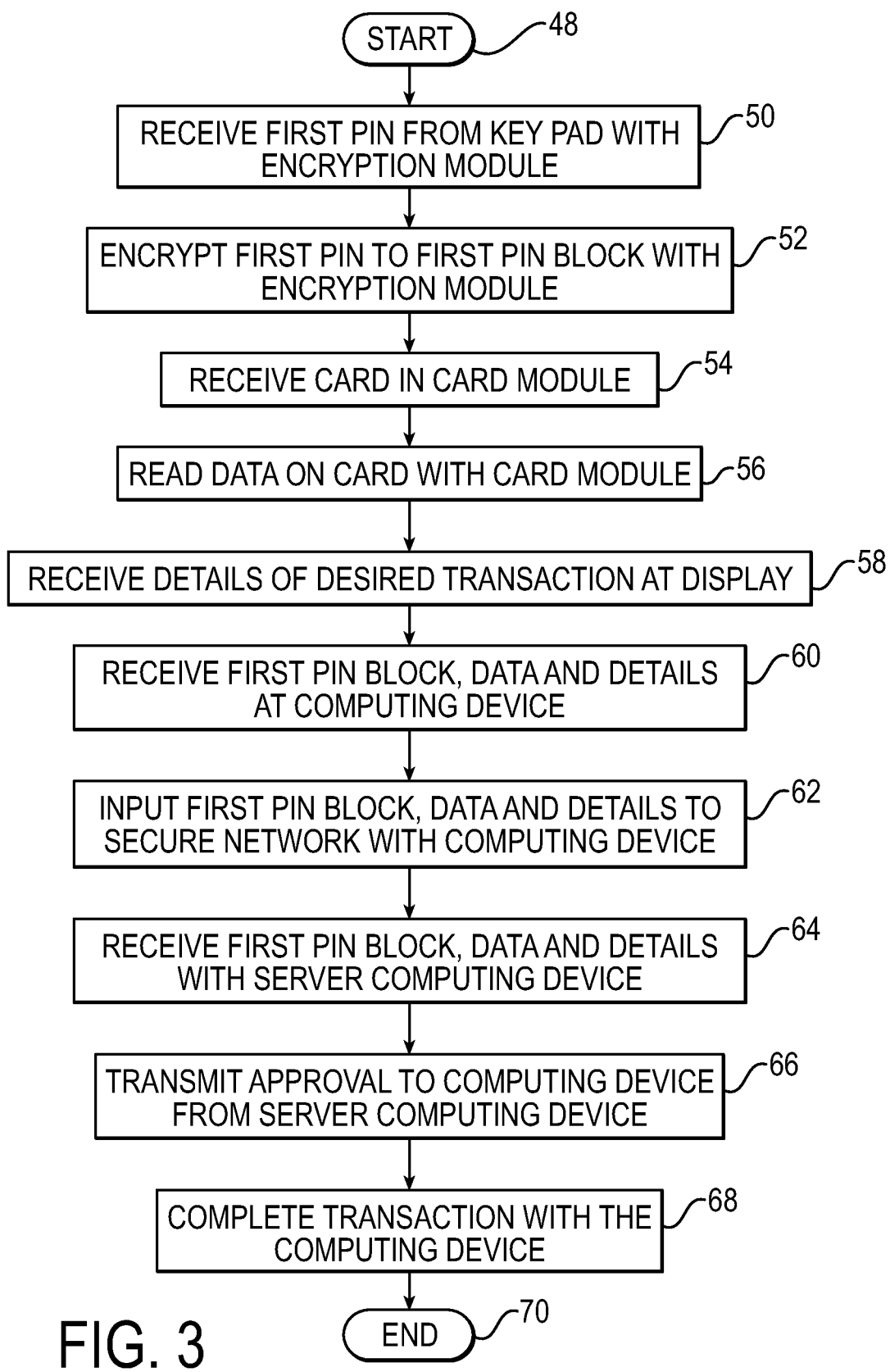
FIG. 3 is a flow diagram of an exemplary method executed by an ATM according to one or more implementations of the present disclosure.

An exemplary operating process completed by the system 40 is disclosed in FIG. 3 and starts at 48. At 50, the encryption module 18 receives a first pin from the key pad 16. At 52, the encryption module 18 encrypts the first pin to a first pin block with a network encryption key. At 54, a card is received by the card module 22. At 56, data stored on the card is read by the card module 22. At 58, details of a desired transaction are received at the display 14. At 60, the first pin block, the card data, and the details of the desired transactions are received at the first computing device 12. At 62, the first pin block, the card data, and the details of the desired transactions are input to the network 36 by the first computing device 12. At 64, the first pin block, the card data, and the details of the desired transactions are received by the server computing device 42. At 66, the server computing device 42 transmits approval of the transaction to the first computing device 12. The transmission occurs over the network 36. At 68, the transaction is completed with the first computing device 12. In one, non-limiting example, at 68, the first computing device 12 controls the article exchange unit 26 to dispense one or more bank notes to the user. The process ends at 70.

As set forth above, the exemplary system 40 can interact with a computing device possessed by a user. A computing device possessed by a user can be a smartphone, such as referenced at 44 in FIG. 2. The smartphone 44 can be operating at least partially under the control of the system 10. For example, the smartphone 44 can be operating a computer application (APP) at least partially controlled by the financial institution, such as a mobile banking APP. The APP, and thus the smartphone 44, can therefore be controlled in part by the computing device 42.

In operation, the exemplary system 40 can execute a transaction that is pre-staged and then completed at the ATM 10. For example, the user can communicate to the computing device 42 a desire to withdraw cash in the future. In FIG. 2, the smartphone 44 is shown in solid line during pre-staging and in dash line when the transaction is completed at the ATM 10. The communication for pre-staging can be generated using the mobile banking APP running on the computing device 44. The computing device 44 can communicate with the computing device 42 over a network 46. The network 46 can be a cellular phone network. The network 36 can be a more secure network than the network 46. The computing device 42 can store the communication from the user. When the user arrives at the ATM 10, the computing device 42 can transmit at least part of the communication to the ATM 10 for quicker completion of the transaction.

Figure 4:
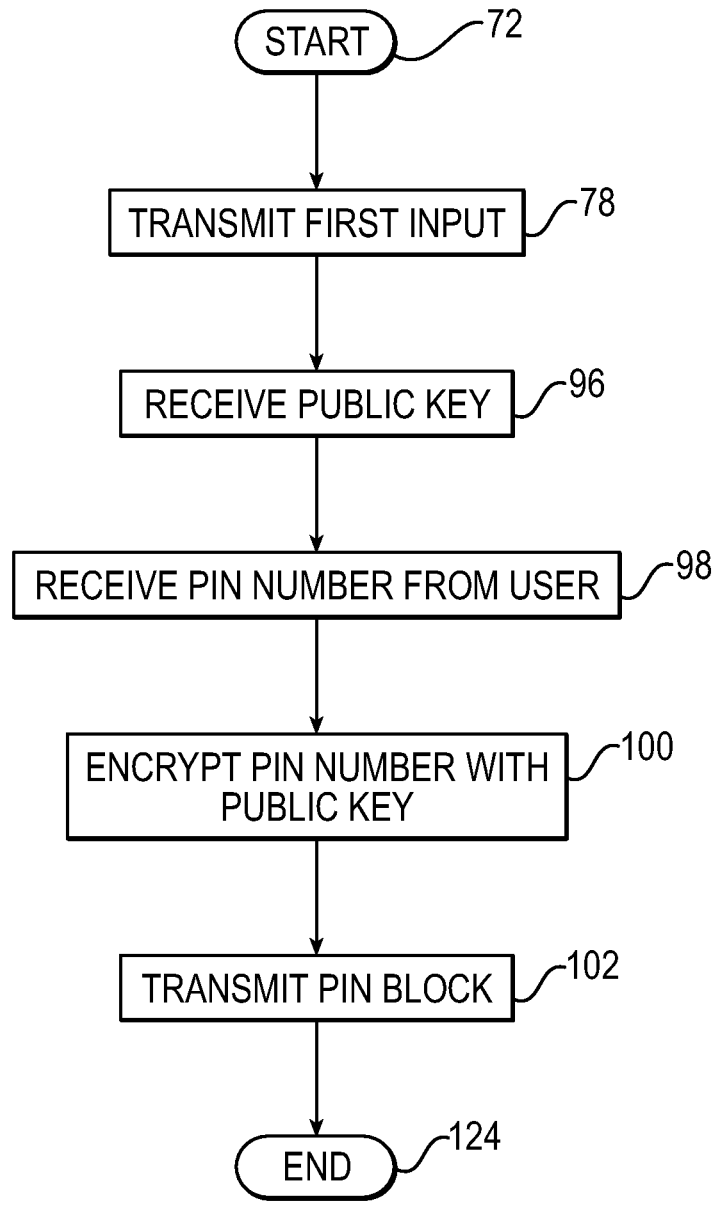
FIG. 4 is a flow diagram of an exemplary method executed by a second computing device according to one or more implementations of the present disclosure.
Figure 5:
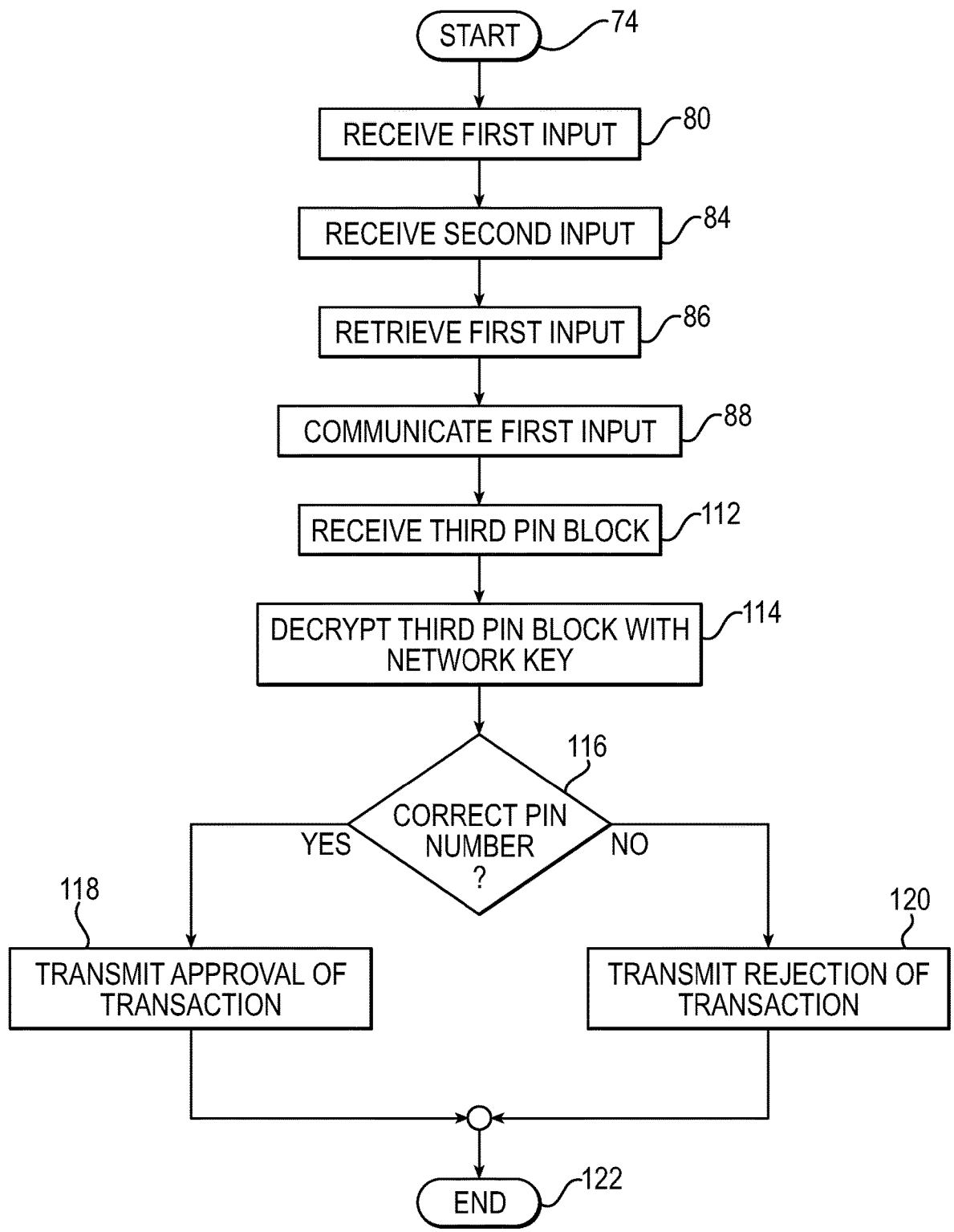
FIG. 5 is a flow diagram of an exemplary method executed by a third computing device according to one or more implementations of the present disclosure.
Figure 6:
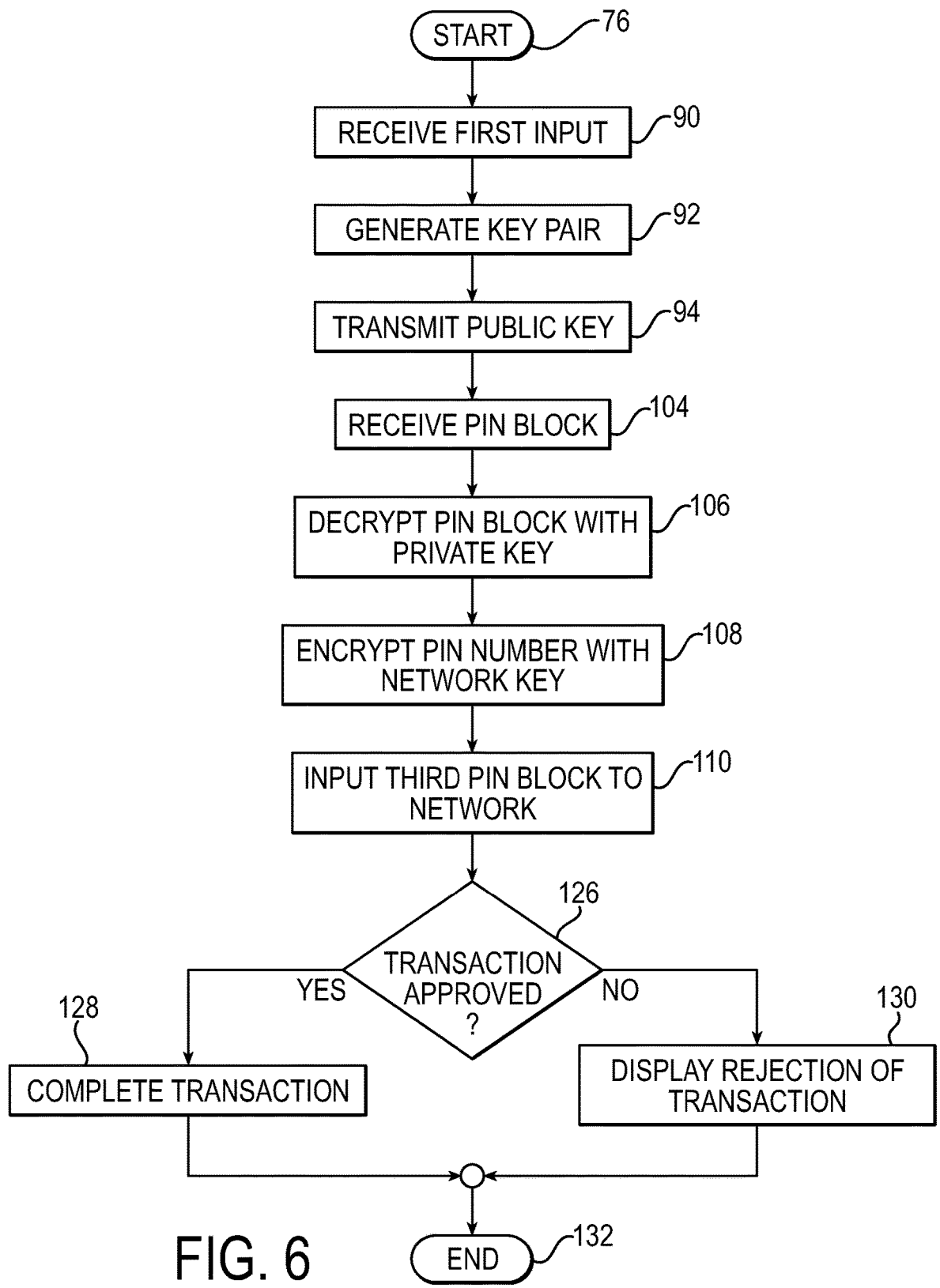
FIG. 6 is a flow diagram of an exemplary method executed by one of a first computing device and an encryption module according to one or more implementations of the present disclosure.

FIGS. 4-6 are flow diagrams of exemplary actions of the various computing devices during the execution of a transaction, including the pre-staging. FIG. 4 is a flow diagram of an exemplary method executed by the second computing device 44 according to one or more implementations of the present disclosure and starts at 72. FIG. 5 is a flow diagram of an exemplary method executed by the third computing device 42 according to one or more implementations of the present disclosure and starts at 74. FIG. 6 is a flow diagram of an exemplary method executed at the ATM 10, by the encryption module 18, according to one or more implementations of the present disclosure and starts at 76.

Referring now to FIG. 4, at 78, the user computing device 44 can generate and transmit the first input. The first input can be generated using the mobile banking APP. The first input can include details of an exchange of at least one physical article that will be performed after the first input is transmitted. The details of the exchange can include the nature of the exchange and the value or amount of the exchange. For example, the physical article can be a check of some amount and the exchange can be the depositing of the check in the ATM 10 by the user. Alternatively, the physical article can be currency and the exchange can be the withdrawal of some amount of currency from the ATM 10 by the user.

Referring now to FIG. 5, at 80, the computing device 42 can receive the first input. The first input is stored in a database accessible by the computing device 42. An exemplary database is referenced at 82 in FIG. 2. In the exemplary embodiment, the ATM 10 is positioned at the exchange location. However, it is noted that the exchange location may be unknown to the computing device 42 when the first input is received in one or more implementations of the present disclosure. In other words, the precise ATM at which the transaction will be finalized may be unknown to the computing device 42 when the first input is received.

Referring further to FIG. 5, at 84 the computing device 42 can receive a second input. The second input can be generated when the computing device 44 is proximate to the ATM 10. The second input can be generated by the computing device 44 or the computing device 12. The second input can include the account information of the user and data associated with the exchange location. The data can be the geographic location of the ATM 10 or can be some other value uniquely associated with the ATM 10 such that the first computing device 14 can identify the ATM 10 from among a plurality of ATMs. In various embodiments of the present disclosure, the user computing device 44 can generate and transmit the second input over the network 46 or the computing device 12 can generate and transmit the second input over the network 36.

Referring further to FIG. 5, the computing device 42 can retrieve the first input from the database 82 at 86, in response to receiving the second input at 84. The computing device 42 can communicate at least part of the first input to the computing device 12 in response to the receiving the second input, as referenced at 88 in FIG. 2. In embodiments in which the second input has been received by the computing device 42 from the user computing device 44, the computing device 42 can transmit all of the first input. In embodiments in which the second input has been received by the computing device 42 from the computing device 12, the computing device 42 can transmit part of the first input. In such embodiments, the computing device 12 has already obtained the account associated with the user. If the entirety of the first input is not communicated to the computing device 12, the part of the first input that is communicated can be the nature of the exchange, such as whether the computing device 12 will receive the article from the user or dispense the article to the user. The part of the first input that is communicated can also include confirmation of the account associated with the user and the amount of transaction.

Referring now to FIG. 6, the computing device 12 can receive the first input (or the portion of the first input) at 90, indicating that a transaction is to be completed. In response, at 92, the encryption module 18 can generate an encryption key pair including a public encryption key and a private encryption key. Both the public encryption key and the private encryption key are distinct from the network encryption key. In the exemplary embodiment of the present disclosure, the encryption key pair are used once and are generated in response to receiving the first input. A new encryption key pair can be generated for each new transaction.

The computing device 12 can prompt the encryption module 18 to generate the key pair in response to receiving the first input. Alternatively, the user, upon reaching the ATM 10, can use the computing device 44 to prompt the encryption module 18 to generate the key pair. The communication prompting generation of the key pair can occur over a wireless link established by the transceiver 38.

The key pair can facilitate asymmetric encryption of the user's pin. The strength of the key pair is significant since the private key is never transmitted and is used only once in the exemplary embodiment of the present disclosure. The key pair can be generated under any desired asymmetric key technique, such as the Diffie-Hellman key exchange protocol, the Digital Signature Standard (DSS), ElGamal, elliptic curve techniques, Paillier cryptosystem, RSA, the Cramer-Shoup cryptosystem, or the YAK authenticated key agreement protocol.

At 94, the encryption module 18 causes the public encryption key to be transmitted to the user computing device 44. In one or more embodiments of the present disclosure, the encryption module 18 can include a dedicated transmitter or the transmission of the public encryption key can occur over the wireless link established by the transceiver 38. As shown in FIG. 4, the user computing device 44 receives the public encryption key at 96.

With continued reference to FIG. 4, the user computing device 44 can prompt the user to enter the pin, such as through the mobile banking APP operating on the user computing device 44 and can then receive the pin at 98. At 100, the user computing device 44 encrypts the pin with the public encryption key, thus generating a pin block based on the user's pin. At 102, the user computing device 44 transmits the pin block to the encryption module 18. After 102, the exemplary actions of the user computing device 44 end at 124.

Referring again to FIG. 6, the generator of the key pair, the encryption module 18, receives the pin block transmitted by the user computing device 44 at 104. The pin block is received over the wireless link established by the transceiver 38 in the exemplary embodiment of the present disclosure. At 106, the encryption module 18 decrypts the pin block received from the computing device 44 to obtain the user's pin. The pin block received from the user computing device 44 is decrypted with the private encryption key of the generated key pair. At 108, the encryption module 18 encrypts the user's pin with the network encryption key to generate another pin block. The encryption module 18 then transmits the third pin block to the computing device 12. At 110, the third pin block is input to the network 46.

Referring again to FIG. 5, the computing device 42 receives the final pin block at 112. At 114, the computing device 42 decrypts the final pin block with the network encryption key to obtain the user's pin. It is noted that the network encryption key can be a symmetric key used at both computing devices 12, 42 or an asymmetric key pair with one of the keys used at the computing device 12 and the other key used at the computing device 42. At 116, the computing device 42 determines whether the pin derived from decrypting the third pin block matches the pin retained in memory, such as retained in the database 82. When the pin derived from decrypting the third pin block matches the pin retained in memory, the computing device 42 transmits approval to complete the transaction to the computing device 12 at 118. When the pin derived from decrypting the third pin block does not match the pin retained in memory, the computing device 42 transmits rejection of the transaction to the computing device 12 at 120. After 118 or 120, the exemplary actions of the computing device 42 end at 122.

Referring again to FIG. 6, the computing device 12 receives the indication of approval or rejection of the transaction at 126. When the transaction is approved, the computing device 12 completes the transaction at 128. Completion of the transaction may involve receiving one or more articles from the user, such as a check or bank notes for deposit. Alternatively, completion of the transaction may involve dispensing one or more articles to the user, such dispensing bank notes as a withdrawal. When the transaction is rejected, the computing device 12 displays, at 130, a message to the user on the display 14 indicating that the desired transaction has been rejected. After 128 or 130, the exemplary actions of the computing device 12 end at 132.

Figure 7:
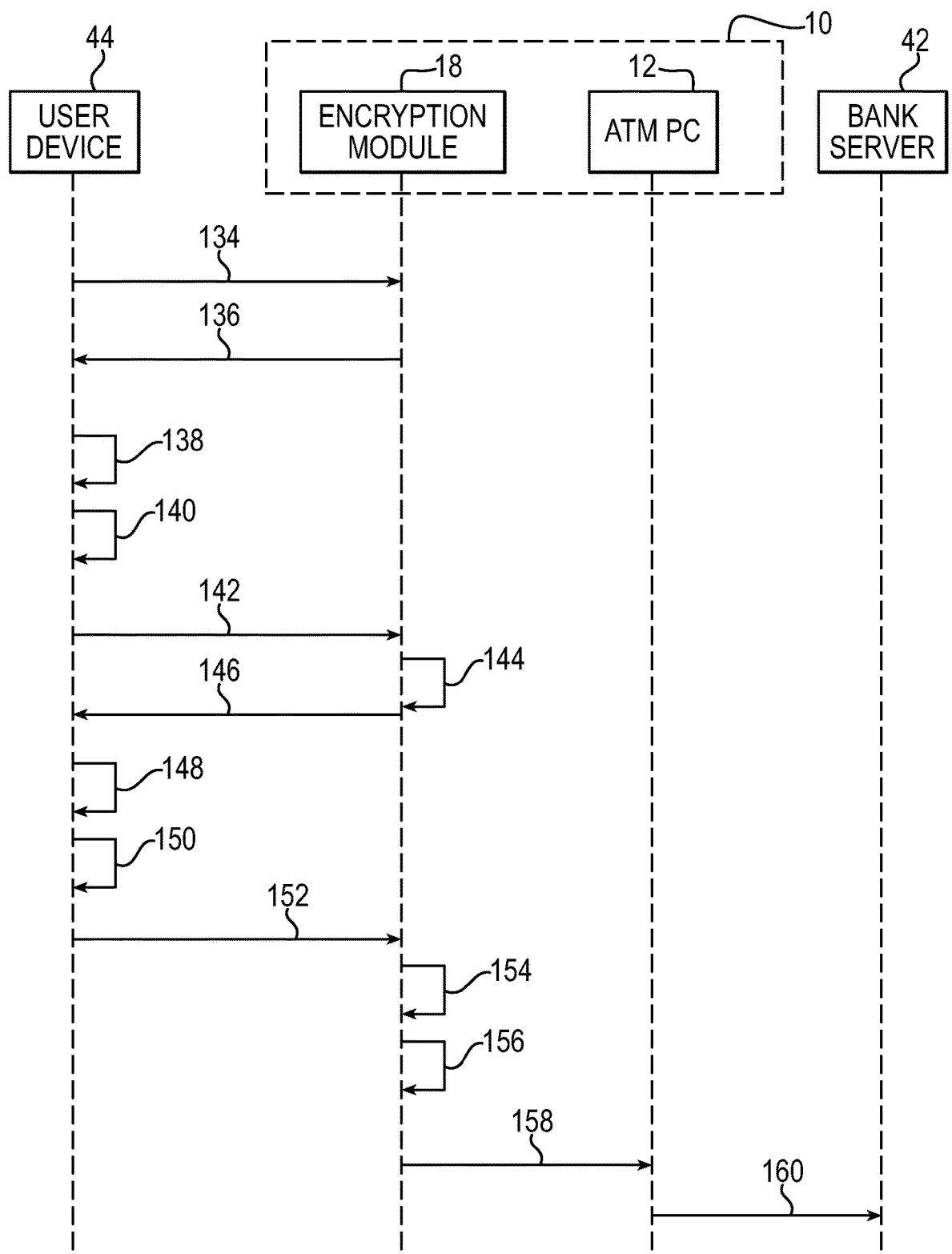
FIG. 7 is an activity diagram of another exemplary process according to the present disclosure.

FIG. 7 is an activity diagram of another exemplary process according to the present disclosure. At 134, the encryption module 18 can receive a request to transmit the second pin from the second computing device in the form of the user's smartphone 44. In other words, the user can engage the ATM 10 to execute a financial transaction. The request can be communicated between the smartphone 44 and the encryption module 18. The request can take any form and be an indication to the encryption module 18 that a pin block is to be received.

The protocol for communication between the encryption module 18 and the smartphone 44 in the second implementation of the present disclosure can require both a signature and encryption. The encryption module 18 can be configured upon manufacture to include at least one asymmetric key-pair and a certificate in memory. In one or more implementations of the present disclosure, the encryption module 18 can include two asymmetric key-pairs and 2 certificates. A first key-pair and certificate can be exclusively used for signature/verification. A second key-pair and certificate can be exclusively used for encryption/decryption. At 136, the encryption module 18 can transmit its certificate(s) to the smartphone 44. The certificate can include a first public encryption key, which is different than the network encryption key. The transmission of the certificate to the smartphone 44 can be completed in response to the request to transmit the second pin. In one or more other embodiments of the present disclosure, the encryption module 18 can transmit the certificate in response to other communications from the smartphone 44, such as a balance inquiry.

At 138, the smartphone 44 checks the legitimacy of the certificate. If the check confirms the legitimacy of the certificate, the smartphone 44 generates a random number at 140. At 142, the smartphone 44 transmits the random number and it is received by the encryption module 18.

At 144, the encryption module 18 prepares a message including the random number and signs the message with a first private signature key. The exemplary first private signature key is different than the network encryption key. At 146, the encryption module 18 transmits the message with the signature back to the smartphone 44.

At 148, the smartphone 44 verifies the signature of the message using the certificate and verifies that the signed random number matches the random number sent at 142. At this point in the exemplary process, the trust has been established between the smartphone 44 and the encryption module 18. At 150, the smartphone 44 encrypts the second pin with the first public encryption key that is associated with the certificate of the encryption module 18, resulting in the second pin block. At 152, the smartphone 44 transmits the second pin block and it is received by the encryption module 18.

At 154, the encryption module 18 can decrypt the second pin block to the second pin using the first private encryption key. The encryption module 18 can then encrypt the second pin to a third pin block with the network encryption key at 156. At 158, the encryption module 18 can transmit the third pin block to the ATM PC, the computing device 12. At 160, the computing device 12 can input the third pin block to the secure network for authorization of the financial transaction requested by the user of the ATM 10.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim.

What is claimed is:

1. A method for inputting pin blocks to a network with an automated transaction machine (ATM) comprising:
   placing a key pad of the ATM in communication with an encryption module of the ATM having one or more processors;
   receiving, at the encryption module, a first pin from the key pad;
   encrypting, at the encryption module, the first pin to a first pin block with a network encryption key;
   placing the encryption module in communication with a first computing device of the ATM having one or more processors;
   transmitting, with the encryption module, the first pin block to the first computing device;
   inputting, with the first computing device, the first pin block to a secure network;
   receiving, at the encryption module, from a second computing device that is a mobile computing device and is physically separate from the key pad, a request to transmit a second pin;
   receiving, at the encryption module, over a wireless link, a second pin block from the second computing device;
   transmitting, with the encryption module, prior to said receiving the second pin block from the second computing device, a certificate and a second certificate to the second computing device, the certificate including a first public encryption key, the first public encryption key different than the network encryption key and the second certificate being a public signature certificate including a first public signature key;

decrypting, with the encryption module, the second pin block to a second pin;

encrypting, with the encryption module, the second pin to a third pin block with the network encryption key; and inputting, with the first computing device, the third pin block to the secure network.

2. The method of claim 1 further comprising:

generating, at the encryption module, a first encryption key pair including the first public encryption key and a first private encryption key, prior to said receiving the second pin block from the second computing device.

3. The method of claim 2 wherein said generating is further defined as:

generating, at the encryption module, the first encryption key pair in response to said receiving the request to transmit the second pin.

4. The method of claim 2 wherein said decrypting further comprises:

decrypting the second pin block to the second pin, at the encryption module after said receiving the second pin block, with the first private encryption key, the first private encryption key different than the network encryption key, said decrypting prior to said encrypting the second pin with the network encryption key.

5. The method of claim 2 further comprising:

utilizing, at the encryption module, the first private encryption key only once.

6. The method of claim 5 further comprising:

receiving, at the encryption module, from a third computing device physically separate from the key pad, a request to transmit a third pin, the third computing device different from the second computing device and the third pin different than the second pin;

generating, at the encryption module, a second encryption key pair including a second public encryption key and a second private encryption key, the second private encryption key different than the first private encryption key and the second public encryption key different than the first public encryption key;

transmitting, from the encryption module, the second public encryption key to the third computing device, the second public encryption key different than the network encryption key;

receiving, at the encryption module, over the wireless link, a fourth pin block from the third computing device;

decrypting the fourth pin block to the third pin, at the encryption module, with the second private encryption key, the second private encryption key different than the network encryption key;

encrypting, with the encryption module, the third pin to a fifth pin block with the network encryption key; and inputting, with the first computing device, the fifth pin block to the secure network.

7. The method of claim 1 wherein said transmitting the certificate and the second certificate is further defined as:

transmitting the certificate and the second certificate to the second computing device in response to said receiving the request to transmit the second pin.

8. The method of claim 1 further comprising:

receiving, at the encryption module, a random number from the second computing device, said receiving the random number prior to said receiving the second pin block from the second computing device and after said transmitting the certificate having the first public encryption key.

9. The method of claim 8 further comprising:

transmitting, with the encryption module, a message with the random number back to the second computing device.

10. The method of claim 9 further comprising:

signing the message, with the encryption module, with a first private signature key, the first private signature key different than the network encryption key.

11. The method of claim 10 further comprising:

verifying, with the second computing device, the signature of the message using the first public signature key of the public signature certificate.

12. The method of claim 11 further comprising:

encrypting, with the second computing device, the second pin with the first public encryption key associated with the certificate.

13. The method of claim 1 further comprising:

receiving, at a third computing device having one or more processors, a first input defining a pre-staged transaction and including details of an exchange of at least one physical article at the first computing device and an account associated with a user, the third computing device remote from the first computing device, the encryption module, and the second computing device;

storing, with the third computing device, the first input in a database;

receiving, at the third computing device, a second input including the account associated with the user and indicative of the second computing device positioned proximate to the encryption module;

retrieving, with the third computing device, the first input from the database in response to said receiving the second input; and communicating, with the third computing device, at least part of the first input to the first computing device in response to said receiving the second input, said communicating prior to said receiving the second pin block from the second computing device.

14. The method of claim 13 further comprising:

generating, at the encryption module, an encryption key pair including the first public encryption key and a first private encryption key, both of the first public encryption key and the first private encryption key distinct from the network encryption key, said generating prior to said receiving the second pin block from the second computing device and in response to said communicating at least part of the first input to the first computing device.

* * * * *